US012748189B2

(12) United States Patent
Carr et al.

(10) Patent No.: US 12,748,189 B2
(45) Date of Patent: Sep. 29, 2026

(54) RESONANT ACTUATOR ASSEMBLY

(71) Applicant: CAMBRIDGE MECHATRONICS LIMITED, Cambridge (GB)

(72) Inventors: Joshua Carr, Cambridge (GB); Andrew Benjamin Simpson Brown, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 900 days.

(21) Appl. No.: 17/927,969

(22) PCT Filed: Jun. 1, 2021

(86) PCT No.: PCT/GB2021/051352
§ 371 (c)(1),
(2) Date: Nov. 28, 2022

(87) PCT Pub. No.: WO2021/024018
PCT Pub. Date: Dec. 2, 2021

(65) Prior Publication Data

US 2023/0296731 A1 Sep. 21, 2023

(30) Foreign Application Priority Data

May 29, 2020 (GB) ..................................... 2008137

(51) Int. Cl.

| | |
|---|---|
| ***G01S 7/481*** | (2006.01) |
| ***F03G 7/06*** | (2006.01) |
| ***G01S 17/894*** | (2020.01) |

(52) U.S. Cl.
CPC ........ *G01S 7/4817* (2013.01); *F03G 7/06143* (2021.08); *G01S 17/894* (2020.01)

(58) Field of Classification Search
CPC .. G01S 7/4817; G01S 17/894; F03G 7/06143; F03G 7/0665; F16F 15/067; F16F 15/06; G06F 3/016
See application file for complete search history.

(56) References Cited

U.S. PATENT DOCUMENTS 10,529,198 B1 1/2020 Khoshkava
10,781,800 B2 * 9/2020 Brown .................. H04N 23/57
(Continued)

FOREIGN PATENT DOCUMENTS

CN 103620928 A 3/2014
CN 104502452 A 4/2015
(Continued)

OTHER PUBLICATIONS

GB Search Report and Examination Report of GB Application 2008137.8 dated Nov. 17, 2020.
(Continued)

*Primary Examiner* — Matthew T Largi
(74) *Attorney, Agent, or Firm* — Van Hoven PC; Stefan D. Osterbur; Joshua Van Hoven

(57) ABSTRACT

A resonant actuator assembly (1) comprising: a support structure (3); a movable part (5) that is capable of relative motion with respect to the support structure; and an actuator arrangement (7) arranged to drive relative motion of the movable part, the resonant actuator assembly being arranged to provide a restoring force to the movable part on displacement from an equilibrium position with respect to the support structure, and the actuator arrangement being arranged to drive the relative motion of the movable part at a resonance of the resonant actuator assembly, the restoring force being non-linear with the displacement.

18 Claims, 11 Drawing Sheets

(56) References Cited

U.S. PATENT DOCUMENTS

| | | | | |
|---|---|---|---|---|
| 2012/0232780 | A1* | 9/2012 | Delson | A63F 13/285<br>340/407.1 |
| 2019/0004603 | A1* | 1/2019 | Longo | G06F 3/041 |
| 2019/0039092 | A1 | 2/2019 | Kim et al. | |
| 2020/0076287 | A1* | 3/2020 | Takahashi | H02K 33/06 |
| 2020/0326779 | A1* | 10/2020 | Jackson | G06F 3/0447 |

FOREIGN PATENT DOCUMENTS

| | | | | | |
|---|---|---|---|---|---|
| CN | 104502454 | A | | 4/2015 | |
| CN | 109617451 | A | | 4/2019 | |
| WO | 2009000859 | A2 | | 12/2008 | |
| WO | 2014080344 | A1 | | 5/2014 | |
| WO | WO-2017208003 | A1 | * | 12/2017 | F03G 7/06143 |
| WO | WO-2019106340 | A1 | * | 6/2019 | F03G 7/06143 |
| WO | WO-2019193337 | A1 | * | 10/2019 | H04N 23/56 |
| WO | 2020226694 | A1 | | 11/2020 | |

OTHER PUBLICATIONS

International Search Report and Written Opinion of PCT/GB2021/051352 dated Sep. 9, 2021.

CN first office action for matter 202180037524.6 dated May 12, 2025, pp. 8.

Office Action for European Application No. 21734464.7, dated Jun. 29, 2026, 7 pages.

* cited by examiner

RESONANT ACTUATOR ASSEMBLY

CROSS-REFERENCE TO RELATED APPLICATIONS

This application is a national stage application under 35 U.S.C. § 371 of International Application No. PCT/GB2021/051352, filed Jun. 1, 2021, which claims priority of GB Patent Application No. 2008137.8, filed May 29, 2020, the disclosures of each of which are hereby incorporated by reference herein in their entireties.

The present invention relates to a resonant actuator assembly.

Actuator assemblies employ an actuator to drive relative motion of a movable part with respect to a support structure. By way of example, the actuator may be one or more shape memory alloy (SMA) wires or a voice coil motor which are employed in many applications requiring precision control with the actuator assembly working away from resonance, as the resonance may impact the performance. However, due to the cooling bandwidth of SMA wire, achieving high stroke displacement and/or high frequency with a typical actuator design is challenging.

In contrast, the displacement and/or frequency of movement may be increased by configuring an actuator assembly as a resonant actuator assembly, where the resonant frequency is designed to match the desired scanning frequency. Merely by way of example, one such application is to move an optical component to scan a beam of light, for example in a time-of-flight sensor system that may be used in a 3D scanning application. Another such application is to provide scanning in a HUD (head-up display) projector. In typical systems of this type, it might be required to scan at relatively high frequency (for example around 100 Hz) in order to provide a high frame rate, and to move the movable object with a relatively high range of displacement, for example 400 μm. Such operational parameters may be achieved with a resonant actuator assembly.

The present invention is concerned with optimising the design of such a resonant actuator assembly.

According to a first aspect of the present invention, there is provided a resonant actuator assembly comprising a support structure, a movable part that is capable of relative motion with respect to the support structure, and an actuator arrangement arranged to drive relative motion of the movable part, the resonant actuator assembly being arranged to provide a restoring force to the movable part on displacement from an equilibrium position with respect to the support structure, and the actuator arrangement being arranged to drive the relative motion of the movable part at a resonance of the resonant actuator assembly, the restoring force being non-linear with the displacement.

Typical resonant systems with a linear restoring force have a sinusoidal response (the response being the behaviour with time of the displacement of the movable part from the equilibrium position). This may not be desirable in all applications. For example, in some applications (such as 3D scanning) the response in the presence of a linear restoring force may be a sinusoidal waveform. This sinusoidal waveform provides a histogram of position against time over the resonance period that has peaks at the extremes of displacement where the relative motion is slow. It may be desirable to flatten the histogram of position against time. This can be achieved, for example, by modifying the response to be closer to a triangular waveform. Modifying the restoring force to be non-linear with the displacement allows the response to be modified to flatten the histogram of position over time.

In some embodiments, the resonant actuator assembly is arranged to provide the restoring force with a stiffness that increases when a magnitude of the displacement from the equilibrium position increases. For example, in an embodiment where the actuator arrangement comprises SMA wires, the SMA wires will excite the resonance (which is designed to be close to a target frequency). Due to the non-linearity of the system the resulting motion is modified from a sinusoid and is therefore an improvement on a simple resonant actuator. The response may be modified toward a triangular waveform.

In some embodiments, the resonant actuator assembly is arranged to provide the restoring force with a stiffness that increases when a magnitude of the displacement from the equilibrium position increases so as to flatten a histogram of position over time over the resonance period, i.e. the probability that an actuator is positioned at any given point along its movement range, compared to be an equivalent system where the restoring force has a constant stiffness. This means that the movable part spends a more equal part of its time in each region of its travel, e.g. the movable part it spends more time in regions with higher probability.

In some embodiments, the resonant actuator assembly is arranged to provide the restoring force with an increase in stiffness when a magnitude of the displacement from the equilibrium position increases above a predetermined threshold. With a linear restoring force, the velocity in the central region of travel of the movable part is approximately constant. Therefore, a significant improvement can be made by only changing the restoring forces near the extremes of the displacement. This may also be more straightforward to implement than changing the behaviour of an element providing the restoring force.

In some embodiments which provide an increase in stiffness when a magnitude of the displacement from the equilibrium position increases above a predetermined threshold, the resonant actuator assembly comprises a resilient bumper between the movable part and the support structure, the resilient bumper being arranged to be disengaged when the magnitude of the displacement from the equilibrium position is below the predetermined threshold and to be engaged to provide the restoring force with the increase in stiffness when the magnitude of the displacement from the equilibrium position increases from the predetermined threshold. Resilient bumpers are readily available, and may be straightforward to retrofit to existing designs of actuator assembly.

In some embodiments, the actuator arrangement comprises at least one SMA wire. SMA wires provide a compact actuation element that can be easily activated using an electrical signal. SMA wires also provide greater force than other actuators of similar size. The SMA wires are used to provide an input driving force for the resonant actuator. Resonant actuation can achieve much higher stroke at high frequency than non-resonant actuators.

In some embodiments, the resonant actuator assembly further comprises a drive circuit arranged to supply drive signals to the at least one SMA wire. In some embodiments, the drive signals comprise pulses at or substantially at a resonant frequency of the resonant actuator assembly. As a result, the drive signals drive relative motion of the movable part with respect to the support structure at the resonance.

In some embodiments, the at least one SMA wire is inclined at an acute angle with respect to a movement axis of the relative motion of the movable part. This provides a gearing effect, such that the SMA wire can provide a displacement of the movable part greater than the change in length of the SMA wire.

In some embodiments, the resonant actuator assembly further comprises at least one intermediate part, and the actuator arrangement comprises plural stages of at least one SMA wire each arranged to drive relative motion between two parts of the support structure, the at least one intermediate part and the movable part in mechanical series so as to additively drive the relative motion of the movable part with respect to the support structure. It is also possible to provide an actuator arrangement with plural stages that does not comprise SMA wires, for example by using multiple voice-coil motors in place of the SMA wires. Using multiple stages can increase the flexibility of design, and may be more robust than using a single stage actuator for high displacements or forces.

In some embodiments, the actuator arrangement comprises opposed SMA wires arranged to drive the relative motion of the movable part in opposite directions along a movement axis. This has the advantage that the SMA wires can act to provide both the restoring force and the driving force, and create a more symmetrical behaviour.

In some embodiments, the actuator arrangement comprises opposed pairs of SMA wires, the SMA wires of each pair being inclined at equal and opposite acute angles with respect to the movement axis of the relative motion of the movable part so as to provide balanced components of force perpendicular to the movement axis. This means that no net force is applied to any bearing that may form part of the support structure, which can reduce strain on the bearing and the support structure. For example, the opposed pairs of wires may act as a bearing arrangement In some embodiments, the opposed SMA wires are inclined at an acute angle so as to provide components of force perpendicular to the movement axis in the same direction. This may be desirable for certain types of bearing that may be used as part of the support structure, which require a force loaded on them to behave correctly.

In some embodiments, the actuator arrangement comprises at least one SMA wire arranged to drive the relative motion of the movable part in a first direction along a movement axis and no SMA wires arranged to drive the relative motion of the movable part in a second direction opposite to the first direction. This may reduce the complexity of the control needed of the SMA wires, as they are used only to apply force in a single direction.

In some embodiments, the resonant actuator assembly further comprises a resilient element connected between the movable part and the support structure, and arranged to provide at least part of said restoring force. Resilient elements are readily available, for example in the form of springs or rubber elements, and so provide a convenient way to provide the restoring force.

In some embodiments, the resonant actuator assembly further comprises a bearing arrangement arranged to guide relative motion of the movable part with respect to the support structure. This can provide more consistent movement of the movable part, and reduce stain on other components.

In some embodiments, the bearing arrangement is arranged to provide no restoring force. In some embodiments, the bearing arrangement is arranged to provide a restoring force that is at least an order of magnitude less than the restoring force provided by the actuator arrangement. This may be advantageous, because the behaviour of the movable part is determined entirely, or near entirely, by another component such as a resilient element or one or more SMA wires. This can simplify the design of the resonant actuator assembly.

In some embodiments, the bearing arrangement is arranged to provide a restoring force that is at least an order of magnitude more than the restoring force provided by the actuator arrangement. In this case, the restoring force is determined almost entirely by the bearing arrangement, which again simplifies the design of the resonant actuator assembly.

In some embodiments, the bearing arrangement comprises a ball bearing arrangement. In some embodiments, the bearing arrangement comprises a flexure arrangement. Both of these arrangements are readily available and provide convenient implementations of a bearing for actuators of this type.

In some embodiments, the resonant actuator assembly further comprises a position detection circuit arranged to derive a measure of the relative position of the movable part with respect to the support structure. This can be used to guide control of the resonant actuator assembly, and in particular the actuator arrangement.

In some embodiments, the resonant actuator assembly further comprises a position sensor arranged to sense the relative position of the movable part from the position sensor, and the position detection circuit is arranged to derive the measure of the relative position of the movable part from the output of the position sensor. A position sensor may be used to derive an accurate measure of the relative position of the movable part and the support structure.

In some embodiments, the actuator arrangement comprises at least one SMA wire, the resonant actuator assembly further comprises a resistance measurement circuit arranged to measure the resistance of the at least one SMA wire, and the position detection circuit is arranged to derive the measure of the relative position of the movable part from the output of the measured resistance. Using the resistance of the SMA wire to determine a measure of position removes the need to provide a separate component to sense the position of the movable part.

In some embodiments, the movable part is an optical component. In some embodiments, the resonant actuator assembly is arranged to scan a beam of light. Rapid and uniform scanning is particularly useful in some types of optical scanning application.

In some embodiments, the resonant frequency is at least 10 Hz. In some embodiments, the range of displacement is at least 10 μm. These represent minimum parameters for some typical applications of this type of resonant actuator arrangement.

According to a second aspect of the present invention, there is provided a resonant actuator assembly comprising a support structure, a movable part that is capable of relative motion with respect to the support structure, and an actuator arrangement comprising at least one SMA wire arranged to drive the relative motion of the movable part, the resonant actuator assembly being arranged to provide a restoring force to the movable part on displacement from an equilibrium position with respect to the support structure, and the actuator arrangement being arranged to drive the relative motion of the movable part at a resonance of the resonant actuator assembly.

SMA wires provide a compact actuation element that can be easily activated using an electrical signal. SMA wires also provide greater force than other actuators of similar size. The SMA wires are used to provide an input driving force for the resonant actuator. Resonant actuation can achieve much higher stroke at high frequency than non-resonant actuators, and SMA wires are particularly suited for this application in compact devices.

According to a third aspect of the present invention, there is provided a system comprising:

a sensor for sensing light, the sensor being configured to provide data dependent on the sensed light; and a resonant actuator assembly comprising:

a support structure;

a movable part that is capable of relative motion with respect to the support structure; and an actuator arrangement arranged to drive the relative motion of the movable part over a movement range, the resonant actuator assembly being arranged to provide a restoring force to the movable part on displacement from an equilibrium position with respect to the support structure, and the actuator arrangement being arranged to drive the relative motion of the movable part at a resonance of the resonant actuator assembly, the restoring force being substantially linear or non-linear with the displacement; and wherein the sensor is configured to cease providing data when the movable part has moved within less than 10%, less than 8%, or less than 5%, of the movement range towards each end of the said movement range.

In some embodiments, the system is a Time of Flight (TOF) system comprising an illumination source for illuminating a subject, wherein the sensor is configured to sense light scattered by the subject. For example, the movable part may comprise an optical component for focusing (by a lens) or reflecting (by a mirror) illumination onto the subject. More specifically, the oscillating movement in the movable part may allow the illumination to scan over an area of interest at the subject.

The sensor may be configured to selectively provide data based on its position within the movement range, e.g. within 40%, or 42%, or 45%, of the movement range in both direction from the equilibrium position. When the sensor ceases to provide data, it may continue to sense light but it may not provide the corresponding data, or it may cease sensing altogether.

Advantageously, such an arrangement may allow data to be provided only when the movable part has moved into positions where flatter regions of a histogram of position over time is expected. This means that the movable part may spend a more equal part of its time in each region during sensing. In particular, such arrangement may beneficial for a resonant system where the restoring force has a constant stiffness, although it may also be applicable for resonant systems where the restoring force being non-linear with the displacement of the movable part.

The various features of the many aspects of the present invention set out above may be applied equally to other aspects of the present invention.

To allow better understanding, embodiments of the present invention will now be described by way of non-limitative example with reference to the accompanying drawings, in which.

Figure 1:
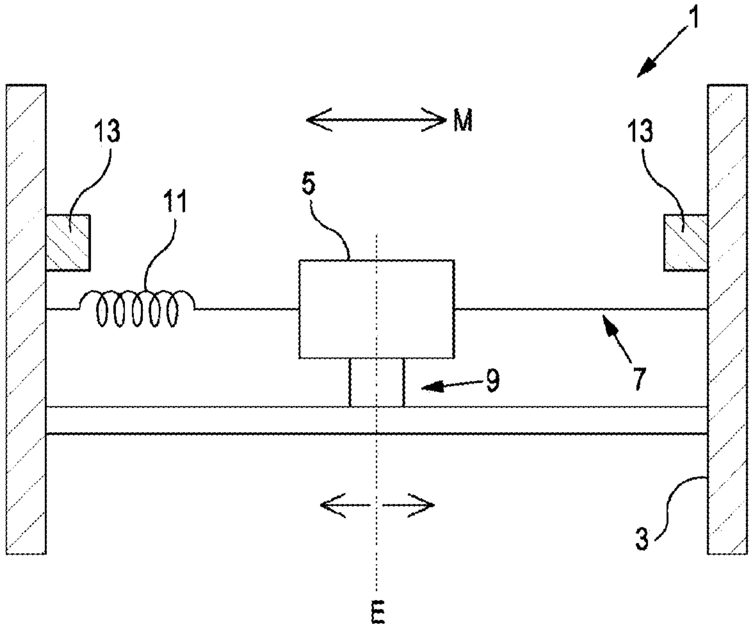
FIG. 1 is a schematic view of a resonant actuator assembly.

FIG. 1 schematically illustrates a resonant actuator assembly 1. The resonant actuator assembly 1 comprises a support structure 3. The support structure 3 may be static, and may for example be fixed to part of a larger assembly or device of which the resonant actuator assembly 1 is a part. The resonant actuator assembly 1 further comprises a movable part 5 that is capable of relative motion with respect to the support structure 3. The movable part 5 may comprise an active element that is to be scanned by the resonant actuator assembly 1, for instance an optical component.

The resonant actuator assembly 1 further comprises an actuator arrangement 7 arranged to drive relative motion of the movable part 5. The relative motion is motion of the movable part 5 relative to the support structure 3. The actuator arrangement 7 is arranged to drive the relative motion of the movable part 5 at a resonance of the resonant actuator assembly 1. In typical applications, the resonant frequency may be at least 10 Hz, or at least 50 Hz. In typical applications, the range of displacement may be at least 10 μm, or at least 50 μm.

The actuator arrangement 7 may be of any suitable type.

The actuator arrangement 7 may comprise at least one SMA wire 8 as shown in the examples below. SMA wires provide a compact actuator that can be easily activated using an electrical signal. SMA wires also provide greater force than other actuators of similar size. The SMA wires 8 are used to provide an input driving force for the resonant actuator. Resonant actuation can achieve much higher stroke at high frequency than non-resonant actuators, and SMA wires are particularly suited for this application in compact devices. In some embodiments, the SMA wire 8 may be angled to movement axis M in order to improve its mechanical gain.

However, the actuator arrangement 7 may be of other types, for example comprising a voice coil motor (VCM).

The resonant actuator assembly 1 comprises a bearing arrangement 9 arranged to guide relative motion of the movable part 5 with respect to the support structure 3. Depending on the nature of the resonant actuator assembly, the bearing arrangement 9 may provide a restoring force to the movable part 5. Example bearing arrangements 9 include a ball bearing arrangement, where one or more ball bearings are placed between the movable part 5 and a part of the support structure 3. An alternative bearing arrangement 9 may be a flexure arrangement, which may be advantageous if the bearing arrangement 9 contributes to providing a restoring force to the movable part 5. In some embodiments, the bearing arrangement 9 may comprise a combination of different types of bearing, for example ball bearings and flexures.

The resonant actuator assembly 1 is arranged to provide a restoring force to the movable part 5 on displacement from an equilibrium position E with respect to the support structure 3. The restoring force always acts to restore the movable part 5 to the equilibrium position. A resilient element 11 is connected between the movable part 5 and the support structure 3. The resilient element 11 contributes to provides the restoring force. The resilient element 11 does not guide relative motion of the movable part 5 with respect to the support structure 3. However, the resilient element 11 is not essential, and in some embodiments, the actuator arrangement 7 may provide the restoring force. Alternatively, both the resilient element 11 and the actuator arrangement 7 may contribute to providing the restoring force.

In summary, the restoring force is provided by one or more of: the bearing arrangement 9, the actuator arrangement 7, the resilient element 11, and a resilient bumper 13. The provision of a restoring force by the bearing arrangement 9 and the actuator arrangement 7 are dependent on their design, some examples being set out below.

A significant restoring force may arise from the actuator arrangement 7, for example if SMA wires 8 are used and the SMA wires 8 cannot cool quickly following actuation. This may lead to the SMA wires 8 continuing to apply force to the movable part 5 even after any actuation signal has ceased. In this case, an option is to minimise any restoring force from the bearing arrangement 9. In this case, typically the bearing arrangement 9 is arranged to provide a restoring force that is at least an order of magnitude less than the restoring force provided by the actuator arrangement 7. If there is not a significant restoring force from the actuator arrangement 7, the bearing arrangement 9 may be designed to optimise the resonance. In this case, typically the bearing arrangement 9 is arranged to provide a restoring force that is at least an order of magnitude more than the restoring force provided by the actuator arrangement 7. The resilient element 11 may be included to provide an additional part of the restoring force, if the designs of the bearing arrangement 9 and actuator arrangement 7 do not provide a sufficient restoring force to optimise the resonant behaviour of the resonant actuator assembly 1.

Due to the cooling bandwidth of SMA wire 8, achieving high stroke (i.e. large displacements from the equilibrium position) at high frequency with a typical actuator design is challenging. Moreover, in the case of applications in mobile devices, the requirement to have a small footprint adds additional complexity. Resonant actuators can overcome many of these limitations, where the resonant frequency is designed to match the desired scanning frequency and the SMA wires 8 are used to provide an input driving force. The advantage of using SMA wires 8 in this type of actuator is their high force and compact size compared to other types of actuator that may be used in small actuator assemblies.

A simple resonant system can be approximated as a simple harmonic oscillator where a spring provides a linear restoring force with increasing displacement. When there is a sinusoidal driving force the response of a simple harmonic oscillator is sinusoidal. In a scanning system, a sinusoidal response is undesirable because the flat top and bottom regions of the dependence of displacement with time mean that the actuator spends disproportionately more time at the extreme positions. Ideally, the actuator would spend an equal proportion of time at all positions. This would be achieved by a displacement that followed a pure triangle waveform with respect to time.

Figure 2:
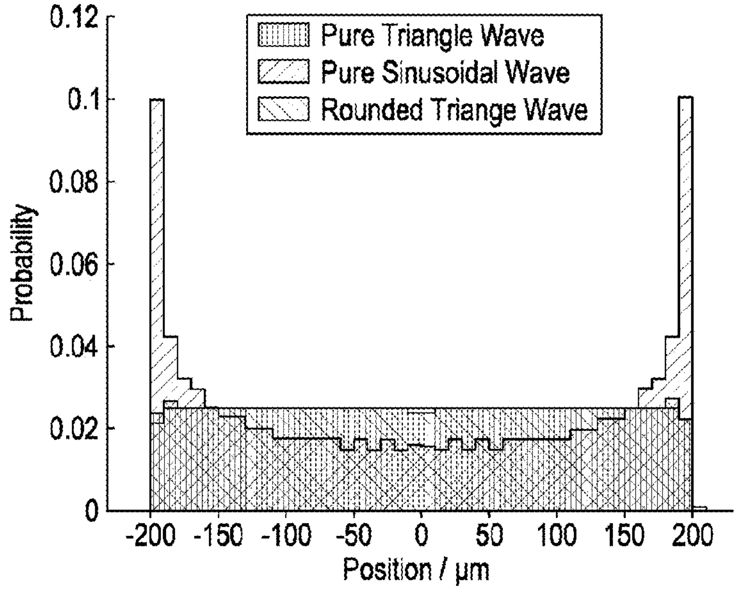
FIG. 2 is a histogram of position against time over the resonance period of a resonant actuator assembly for some forms of restoring force.

FIG. 2 shows a histogram of position of a resonant system sampled at equal time intervals, and shows the probability of the actuator being at any given position at a random time. A pure sinusoid, pure triangle wave, and smoothed triangle wave dependence of displacement with time are compared. The closer the histogram is to flat (i.e. an equal probability of all positions) the better in linear scanning applications. FIG. 2 shows that the sinusoidal wave spends disproportionately more time at the extremes of motion, while the triangle wave has equal probability across the full range of motion.

Advantageously, in the present invention, the restoring force is non-linear with the displacement. This allows the response of the resonant actuator assembly 1 to be modified, which in turn allows the histogram of position to be modified. Some examples of this will now be described.

The restoring force can be plotted as a function of the position of the movable part 5 relative to the equilibrium position. By changing the restoring force as a function of position, the response of the movable part 5 to an input drive force can be altered.

In some embodiments, the resonant actuator assembly 1 is arranged to provide the restoring force with a stiffness that increases when a magnitude of the displacement from the equilibrium position increases. Stiffness here refers to the rate of change of the restoring force with an increase in displacement. This means that the restoring force increases more rapidly with displacement as the displacement becomes higher.

Figure 3:
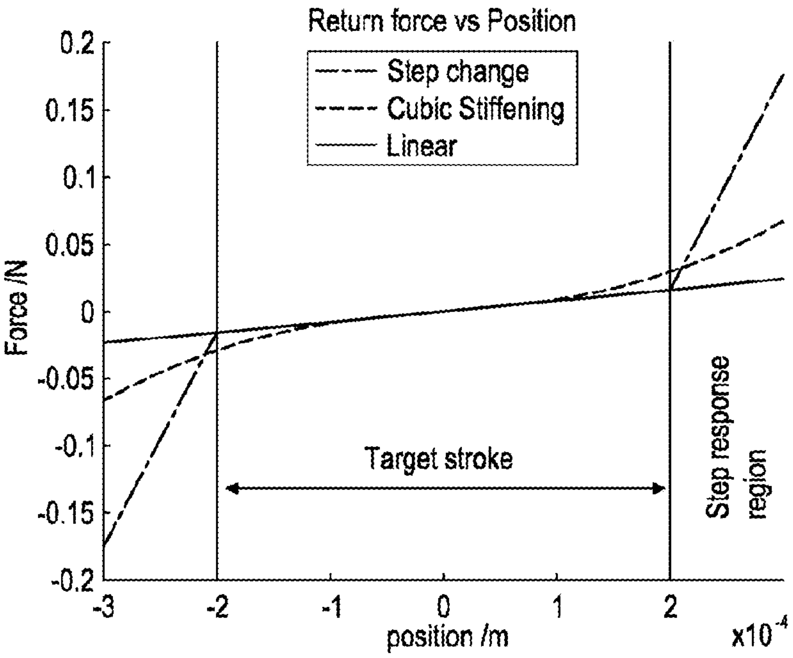
FIG. 3 is a plot of different forms of the restoring force against position in the resonant actuator assembly.

FIG. 3 shows the restoring force as a function of position from the equilibrium position for three different dependences of the restoring force on displacement, as follows.

A first curve shows a linear dependency, resulting in simple harmonic motion, with a restoring force linearly proportional to displacement.

A second curve shows the restoring force having cubic stiffening. In this case, a term having a cubic dependence on displacement increases the restoring force at greater magnitudes of displacement relative to the linear restoring force.

A third curve shows the restoring force having a stiffness that has a step increase above a threshold. In this case, the effective stiffness of the "spring" providing the restoring force has a step change above a certain threshold in the displacement. The dependence on displacement is linear at all displacements, but the gradient increases above the threshold. The "spring" referred to here is merely a conceptual device used to model the restoring force. In reality, as described above, the restoring force may be provided in a number of different ways, which may not involve a spring or any resilient element. The threshold of the displacement might be the desired maximum amplitude of motion. In such an embodiment, the resonant actuator assembly 1 is arranged to provide the restoring force with an increase in stiffness when a magnitude of the displacement from the equilibrium position increases above a predetermined threshold.

Figure 4:
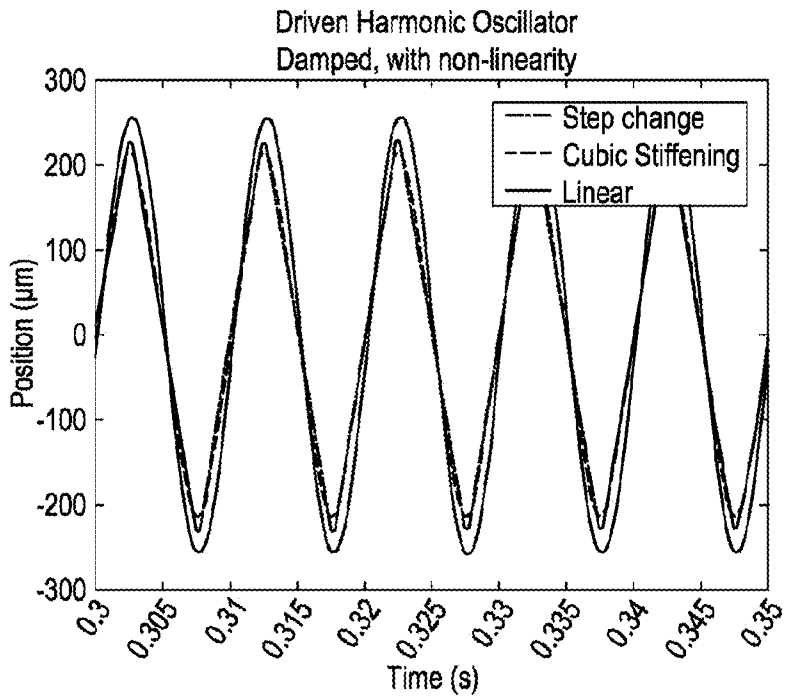
FIG. 4 is a plot of the response in the resonant actuator assembly to the different forms of the restoring force.
Figure 5:
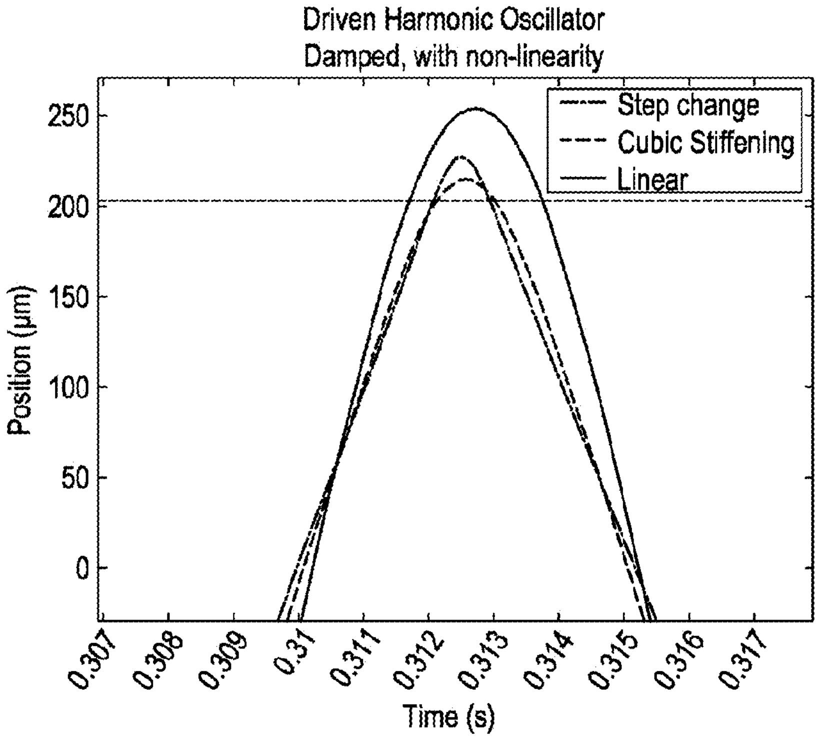
FIG. 5 is an expanded part of the plot of FIG. 4.

FIGS. 4 and 5 demonstrate the response of a resonant system modelled with a sinusoidal input driving force (in this example at 100 Hz) and a small damping term. By implementing a step change in the restoring force above a predetermined threshold (i.e. option 3 discussed in relation to FIG. 3 above) the sinusoidal response is distorted. Compared to the case of the linear restoring force, the response becomes closer to a triangular response. This is clear in the linearity of the motion at displacement of under 200 μm in FIG. 5, where the step change is much more linear than the curve for the linear restoring force. It is also clear that the step change restoring force requires less time for the direction reversal.

Figure 6:
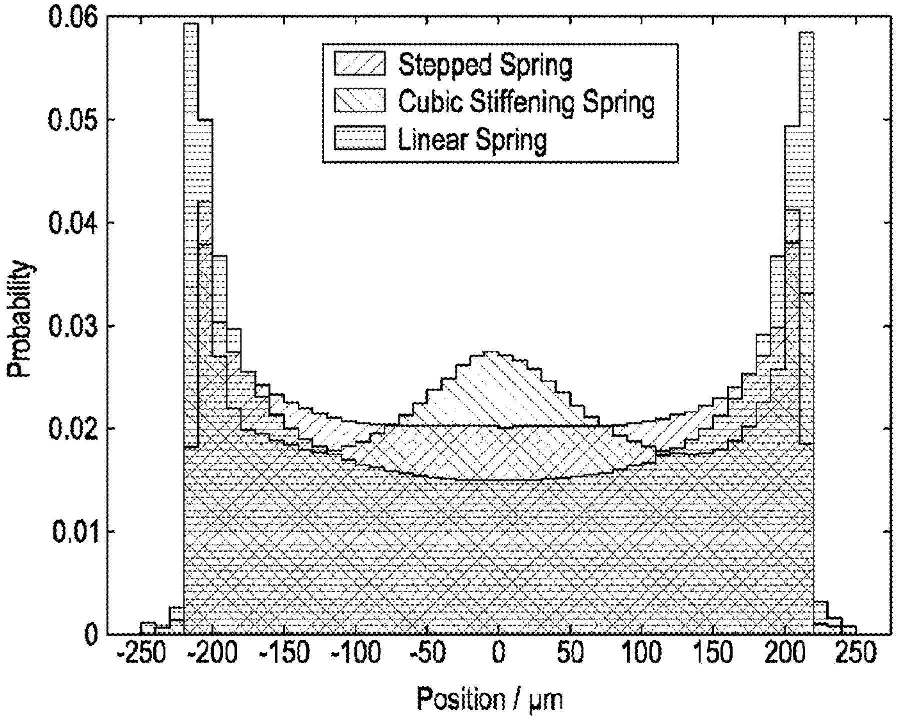
FIG. 6 is a histogram of position against time over the resonance period of a resonant actuator assembly for the forms of restoring force shown in FIGS. 4 and 5.

FIG. 6 shows how the restoring force with a step change in stiffness flattens the histogram of position compared to the linear restoring force. This confirms that the step change in the stiffness of the restoring force causes a shift toward more equal probability of each position being occupied. This improvement can be quantified as the ratio between the time spent by the movable part 5 at the most extreme position compared to the time spent at the central, equilibrium position. With a linear restoring force this ratio is approximately 3:1, so for each second the movable part 5 spends at the equilibrium position, it has spent three seconds at the extreme position. With the step change restoring force, the ratio is 2:1 meaning that the movable part 5 spends twice as much time at the extremes than at the equilibrium position. As a reference, an ideal actuator may have a ratio of 1:1. Thereby, the resonant actuator assembly 1 is arranged to provide the restoring force with a stiffness that increases when a magnitude of the displacement from the equilibrium position increases, so as to flatten a histogram of position against time over the resonance period compared to be an equivalent system where the restoring force has a constant stiffness.

A non-linear restoring force may be achieved in any suitable way.

By way of example FIG. 1 illustrates one possible way of providing the restoring force with an increase in stiffness when a magnitude of the displacement from the equilibrium position increases above a predetermined threshold. In this example, the resonant actuator assembly 1 comprises a resilient bumper 13 between the movable part 5 and the support structure 3. The resilient bumper 13 is arranged to be disengaged when the magnitude of the displacement from the equilibrium position is below the predetermined threshold and to be engaged to provide the restoring force with the increase in stiffness when the magnitude of the displacement from the equilibrium position increases from the predetermined threshold. The resilient bumper 13 may be formed in any suitable way. Some non-limitative examples include forming the resilient bumper as member biased by a resilient element (for example a spring), or by forming the resilient bumper from resilient material (for example rubber).

With a linear restoring force, the natural frequency of the resonator is not dependent on the amplitude of the displacement from equilibrium. The response is a pure sinusoid at the natural frequency, and as the input driving force grows, the maximum amplitude of the displacement grows, but the frequency remains the same. A further advantage of providing a non-linear restoring force is that the period of the natural frequency becomes dependent on the amplitude of the oscillation. It may be desirable to change the natural frequency of the system, for example to compensate for manufacturing variation between actuator assemblies, or to ensure the resonant frequency matches the desired frequency as closely as possible. With a non-linear restoring force, by changing the amplitude of the input driving force, the natural frequency of the resonant actuator assembly 1 can be dynamically adjusted. This may be advantageously in a scanning system such as a Time of Flight (TOF) system, where the scanning rate may be synchronised with the frame rate of a sensing unit.

FIGS. 7 to 11 illustrate five examples of the resonant actuator assembly 1. In each example, the same reference numerals are used to describe corresponding components. Some common points apply to multiple of the illustrated embodiments.

The actuator arrangement 7 comprises at least one SMA wire 8, and the at least one SMA wire 8 is inclined at an acute angle with respect to a movement axis M of the relative motion of the movable part 5. Inclining the SMA wire 8 in this way provides a gearing effect, such that the displacement caused by actuation of the SMA wire 8 can be made greater than the absolute change in length of the SMA wire 8.

Figure 8:
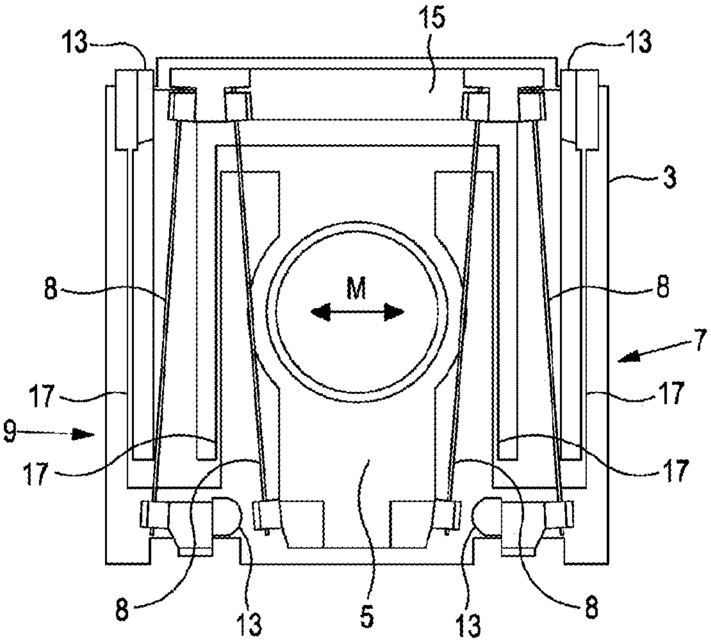
Figure 9:
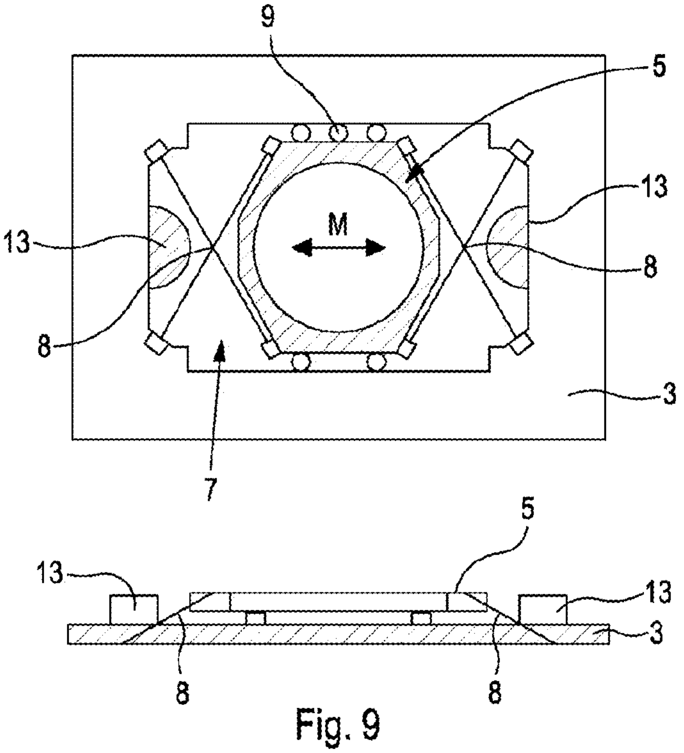
FIG. 9 is a plan view and side view of a third example of the resonant actuator assembly.
Figure 10:
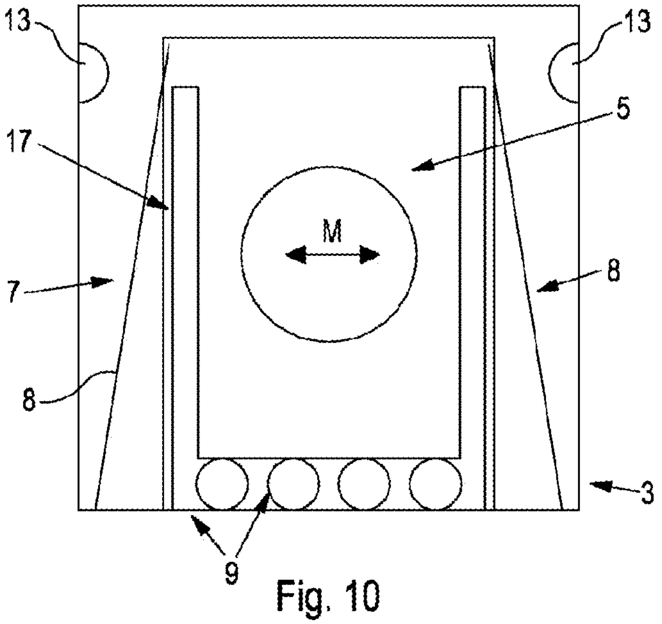
FIGS. 10 and 11 are plan views of first and second examples of the resonant actuator assembly.

In all of the embodiments of FIGS. 7 to 11, except that of FIG. 10, the actuator arrangement 7 comprises opposed SMA wires 8 arranged to drive the relative motion of the movable part 5 in opposite directions along a movement axis M. This means the motion of the movable part can be driven in both directions along the movement axis M.

In all the embodiments, a resilient bumper 13 is provided between the movable part 5 and the support structure 3. The resilient bumper 13 is arranged to be disengaged when the magnitude of the displacement from the equilibrium position is below the predetermined threshold and to be engaged to provide the restoring force with the increase in stiffness when the magnitude of the displacement from the equilibrium position increases from the predetermined threshold. This provides a restoring force with a step change in stiffness, as described above.

Figure 7:
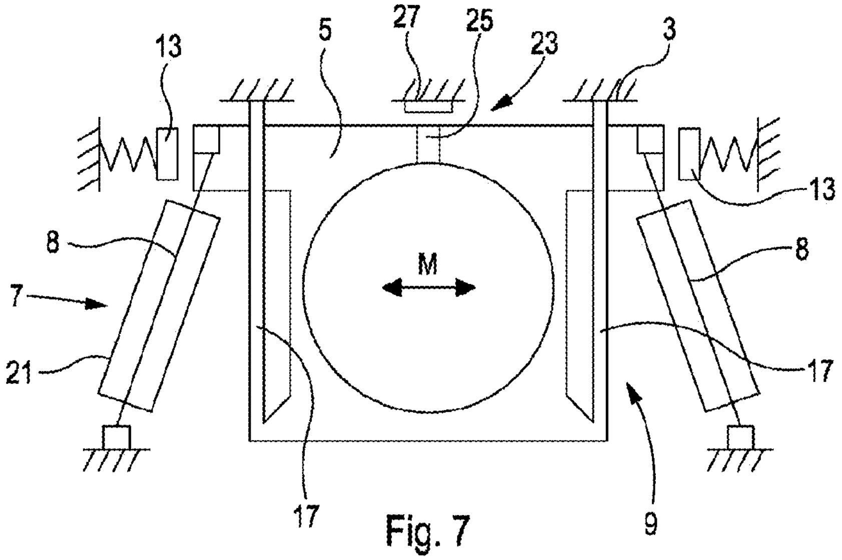
FIGS. 7 and 8 are plan views of first and second examples of the resonant actuator assembly.

FIG. 7 shows a mechanical implementation of the resonant actuator assembly 1 using a support structure 3 and a bearing arrangement 9 comprising low stiffness support flexures 17 to guide the motion along a movement axis M. In use, the low stiffness support flexures 17 may preferably be operating in tension. The actuator arrangement 7 comprises two opposing SMA wires 8 (which are normally slack in the absence of an actuation signal) arranged to drive the relative motion of the movable part 5 in opposite directions along a movement axis M. The SMA wires 8 provide the required driving force (or impulse) in opposite directions. The SMA wires 8 are angled to the flexures 17 and the movement axis M such that their contraction has high mechanical gain (i.e. the gearing effect mentioned above). This arrangement may provide a stroke of more than 200 μm with a footprint of 9.5 mm. Cooling plates 21 are provided adjacent to each SMA wire 8 to increase the rate of cooling of the SMA wires 8. The combination of the stiffness of the SMA wire 8, the mechanical gain of the system, and the stiffness of the flexures 17 contributes to the overall stiffness of the system in the central linear region around the equilibrium position of the actuator 1.

The position of the movable part 5 should preferably be known, as will be discussed further below. One option to locate the movable part 5 is to use resistance feedback of the SMA wires 8. The implementation in FIG. 7 instead uses a position sensor 23 comprising a Hall sensor 27 and magnet 25 to measure the position.

At the extremes of the motion of the movable part 5 in FIG. 7 are resilient bumpers 13 formed from 'high stiffness' springs. The resilient bumpers 13 cause a step change in the stiffness of the restoring force. The resilient bumpers 13 could alternatively be rubber bumpers, damping gel, or another soft elastic material. The function of these resilient bumpers 13 is to dramatically increase the system stiffness when the amplitude of the motion of the movable part 5 (i.e. its displacement from the equilibrium position) exceeds a predetermined threshold, for example a target amplitude. As shown above, this results in the movable part 5 changing direction more rapidly than if a purely linear restoring force were used.

FIG. 8 shows another implementation of the resonant actuator assembly 1 comprising multiple gain stages. In this embodiment, the resonant actuator assembly 1 further comprises at least one intermediate part 15. The actuator arrangement 1 comprises plural stages of at least one SMA wire 8 each arranged to drive relative motion between two parts of the support structure, the at least one intermediate part 15 and the movable part 5 in mechanical series so as to additively drive the relative motion of the movable part 5 with respect to the support structure 3. The plural stages each of at least one SMA wire 8 comprise one stage connected between the movable part 5 and the intermediate part 15, and one stage between the intermediate part 15 and the support structure 3. However, further stages may be provided.

A bearing arrangement 9 is provided, which comprises two sets of flexures 17. A first set of flexures 17 is provided between the intermediate part 15 and the movable part 5, and a second set of flexures 17 between the intermediate part 15 and the support structure 3. The flexures 17 contribute to providing the restoring force. This embodiment has the advantage of increasing the length of SMA wire, which reduces the stiffness and increases the wire stroke. This in turn means a lower mechanical gain is required.

FIG. 9 shows an embodiment where the bearing arrangement 9 does not comprise flexures and does not provide the restoring force which is provided instead by the actuator arrangement 7 which comprises opposed pairs of SMA wires 8. The opposed pairs of SMA wires 8 are arranged to drive the relative motion of the movable part 5 in opposite directions along a movement axis M. The SMA wires 8 of each pair are inclined at equal and opposite acute angles with respect to the movement axis M of the relative motion of the movable part 5 so as to provide balanced components of force perpendicular to the movement axis M. The acute angles are preferably less than 10°, and more preferably less than 5°.

The crossed SMA wires 8 are used to implement a resonance that depends only on the stiffness of the SMA wires 8 and not on the stiffness of a guiding flexure 17. The four SMA wires 8 are provided in two pairs of crossed wires to control the motion of the movable part. This improves the linearity of the relative motion between the movable part 5 and the support structure 3. It also increases the force acting in the direction of motion, which is advantageous in situations where there is high mechanical gain required to start the motion. Resilient bumpers 13 are provided at the ends of the desired movement range in order to provide non-linear stiffness.

The bearing arrangement 9 comprises ball bearings. Due to the balanced components of force perpendicular to the movement axis M from the SMA wires 8, the bearing arrangement 9 is merely used to guide movement of the movable part 5 along the movement axis M and prevent rotation of the movable part 5 relative to the support structure 3. Provision of the bearing arrangement 9 is advantageous, but nonetheless optional.

FIG. 10 shows an embodiment where the bearing arrangement 9 comprises both flexures 17 and ball bearings. In this embodiment, the flexures are optional. The actuator arrangement 7 comprises two opposing SMA wires 8 arranged to drive the relative motion of the movable part 5 in opposite directions along a movement axis M. The opposed SMA wires 8 are inclined at an acute angle so as to provide components of force perpendicular to the movement axis M in the same direction. In this embodiment, providing the components of force in the same direction loads the bearing assembly. In other words, the SMA wires 8 load the bearing arrangement, by pulling the movable part 5 down onto the ball bearings to provide a low friction guide for the motion of the movable part.

Figure 11:
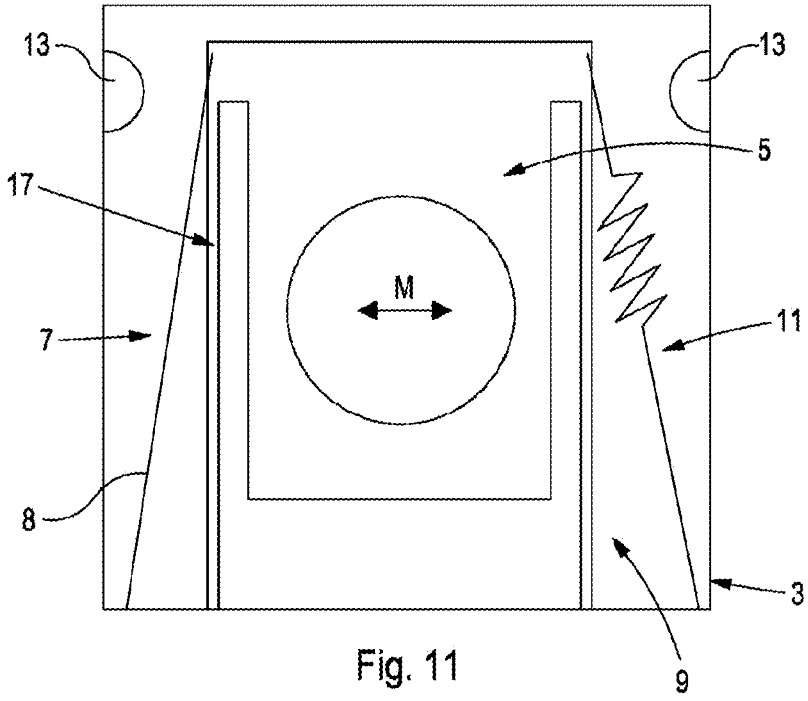

FIG. 11 shows a further embodiment in which the bearing arrangement 9 comprises flexures 17. The actuator arrangement 7 comprises a single SMA wire 8 arranged to drive the relative motion of the movable part in a first direction along a movement axis and no SMA wires 8 arranged to drive the relative motion of the movable part in a second direction opposite to the first direction. In the case of FIG. 11, only a single SMA wire 8 is provided, although more SMA wires 8 may be provided, for example to increase the force acting in the direction of motion, as described above. A resilient element 11 (in this case a spring) provides the restoring force in the direction opposite to that in which the SMA wire 8 drives the movable part 5.

Figure 12:
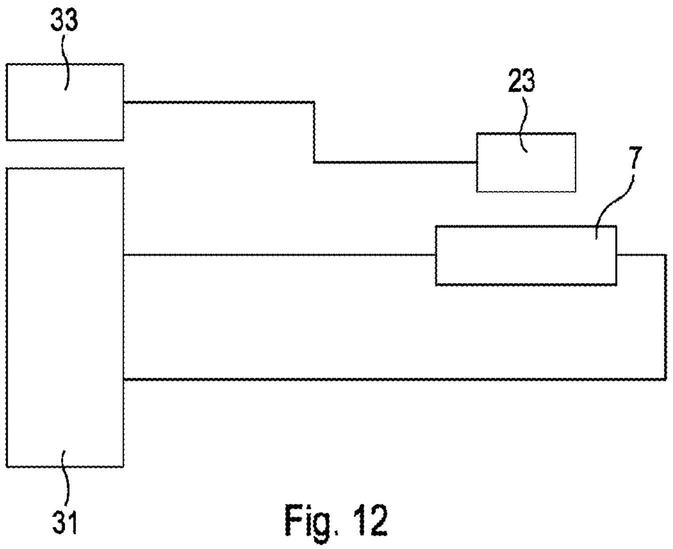
FIGS. 12 and 13 are diagrams of different forms of a circuit of the resonant actuator assembly.
Figure 13:
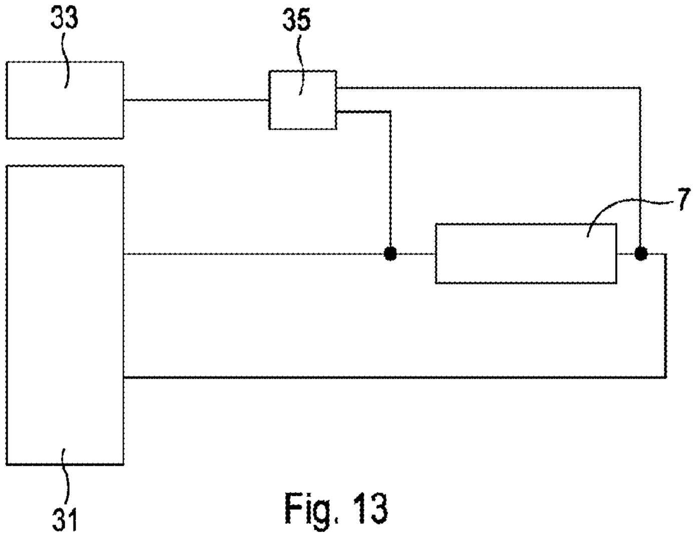

FIGS. 12 and 13 show two alternative circuits that may be used in any of the embodiments of the resonant actuator assembly 1 described above, although for simplicity, the movable part 5 and support structure 3 are not shown in FIGS. 12 and 13. In each case, the resonant actuator assembly 1 further comprises a drive circuit 31 arranged to supply drive signals to the actuator arrangement 7, which in this embodiment comprises at least one SMA wire 8. A single SMA wire 8 is shown in FIGS. 12 and 13 for simplicity, but there may be plural SMA wires 8 as described above.

The embodiments of FIGS. 12 and 13 also show resonant actuator assemblies 1 that further comprise a position detection circuit 33 arranged to derive a measure of the relative position of the movable part 5 with respect to the support structure 3. As mentioned above, it is often desirable to be able to determine the position of the movable part 5 with respect to the support structure 3. For example, the position may be used to control the drive circuit 31, or to control the opposed SMA wires 8 in embodiments where SMA wires 8 are arranged to drive the relative motion of the movable part 5 in opposite directions along a movement axis M.

FIG. 12 shows an embodiment in which the resonant actuator assembly 1 further comprises a position sensor 23 arranged to sense the relative position of the movable part 5 from the position sensor 23. The position sensor 23 is connected to the position detection circuit 33. The position detection circuit 33 is arranged to derive the measure of the relative position of the movable part 5 from the output of the position sensor 23. The position sensor 23 may be a magnetic sensor, for example a Hall sensor 27. As shown in FIG. 7, where the position sensor is a Hall sensor 27, a magnet 25 may be provided on the movable part 5. Alternatively, the Hall sensor 27 may be placed on the movable part 5 and connected to the position detection circuit 33 via a flexible connector.

Where the actuator arrangement 7 comprises at least one SMA wire 8, the measure of position can be determined without using a dedicated position sensor 23. FIG. 13 shows an embodiment in which the resonant actuator assembly 1 further comprises a resistance measurement circuit 35 arranged to measure the resistance of the at least one SMA wire 8 of the actuator arrangement 7. In this embodiment, the position detection circuit 33 is arranged to derive the measure of the relative position of the movable part 5 from the output of the resistance measurement circuit 35. Since the resistance of an SMA wire 8 is related to its temperature and its phase, the position can be determined by determining whether the SMA wire 8 is actuated from its resistance.

The drive circuit 31 may actuate the actuator arrangement 7 using any suitable drive scheme to generate the drive signals.

Figure 14:
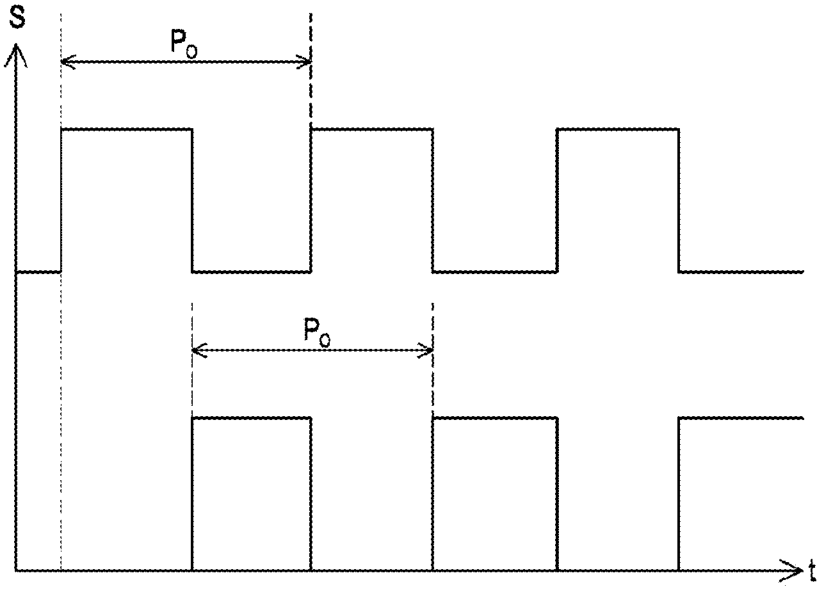
FIG. 14 is a diagram of pulsed drive signals.

FIG. 14 shows an example in which the drive signals comprises pulses at a resonant frequency of the resonance. The frequency of the pulses in FIG. 14 is given by $f=1/P_0$. The two drive signals (upper and lower) in FIG. 14 represent the drive signals used to actuate the two opposing SMA wires 8 arranged to drive the relative motion of the movable part 5 in opposite directions along a movement axis M in an embodiment such as that of FIG. 10. The drive signals used to actuate the opposing SMA wires 8 (or opposing sets of SMA wires 8) are out of phase. This ensures that each SMA wire 8 (or set of SMA wires 8) only drives the motion of the movable part 5 at an appropriate part of its oscillation to drive the resonant motion (rather than to damp it). In the example of FIG. 14, the pulses have a 50% duty cycle and the two drive signals are 180° out of phase with one another. However, other duty cycles may be used as appropriate depending on the design of the resonant actuator assembly 1. It may also not be necessary for the drive signals to be exactly 180° out of phase with one another. Other pulse shapes than square pulses may also be used.

Other drive schemes may be applied. For example, in the case of FIG. 13, the drive circuit 31 may generate drive signals using resistance based feedback control based on the output of the resistance measurement circuit 35.

In general, the movable part 5 may be of any type, and used for any application. In one type of application, the movable part 5 may be an optical component, for example a light source, lens element, or mirror. Alternatively the optical component may be mounted on or connected to the movable part 5. When the movable part 5 is an optical component, the resonant actuator assembly 1 may be arranged to scan a beam of light.

Figure 15:
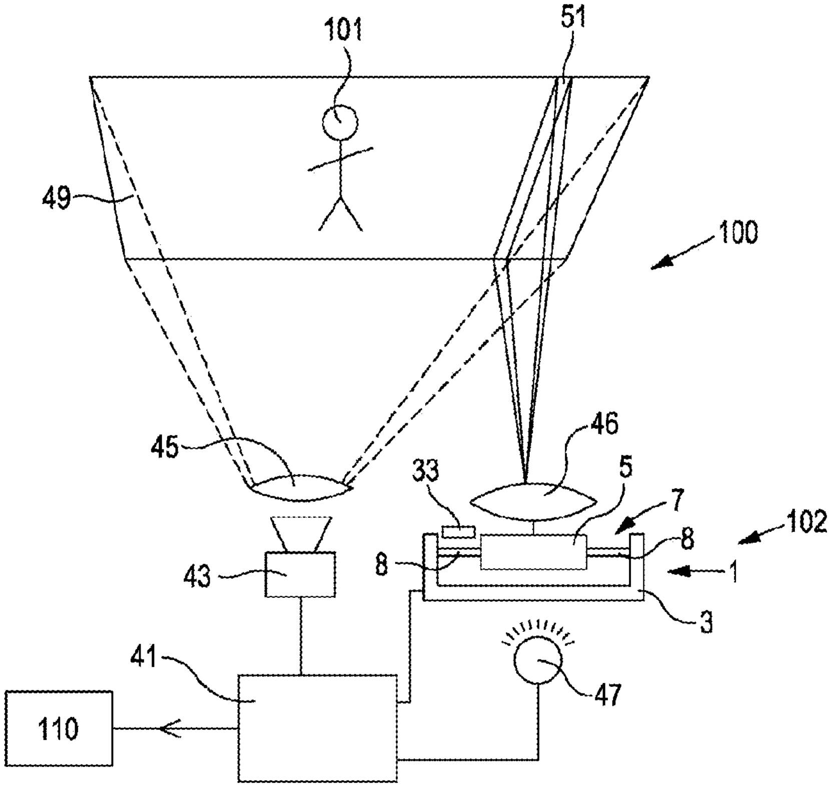
FIG. 15 is a schematic view of a time-of-flight sensor system incorporating the resonant actuator assembly.

FIG. 15 illustrates an example in which resonant actuator assembly 1 is incorporated in a time-of-flight sensor system 100 which scans a beam of light 51 for use in a 3D scanning application. The movable part 5 is configured to scan the beam of light 51 from a light source 47.

The system 100 comprises a light source 47. In FIG. 15, the light source 47 is a vertical cavity surface emitting laser (VCSEL), although in general any type of light source may be used, for example a light emitting diode (LED), laser diode, incandescent bulb, or similar. The light source 47 emits a line of illumination 51 to illuminate a subject 101 in the field of view 49 of a time of flight (ToF) image sensor 43. Receiving optics 45 collect light from the light source 47 reflected from the subject 101 to be provided to the image sensor 43. to which a time-of-flight is to be measured. The system 100 also comprises a transmitting optical system 102. The transmitting optical system 102 comprises the light source 47, transmission optics comprising a lens element 46 to direct the light emitted from the light source 47, and a resonant actuator assembly 1 of the type described above.

The resonant actuator assembly 1 (which may take the form of any of the above examples) is configured to move the illumination 51 provided by the light source 47 (a VCSEL) by moving the movable part 5 relative to the support structure 3. More specifically, the movable part 5 moves in a direction orthogonal to the optical axis of the illumination. The movable part 5 in this example comprises the lens element 46.

The system 100 also comprises a ToF image sensor 43 having a sensor surface and being configured to sense light scattered by the subject 101 from the light source 47, and to provide depth data dependent on the sensed light.

Significantly, the system 100 also comprises a position detection circuit 33. In this example, the resonant actuator assembly 1 comprises the position detection circuit 33. However, in some cases the position detection circuit 33 may be provided as a separate component to the resonant actuator assembly 1. In this example, the position detection circuit 33 determines position data of the movable part 5 by measuring the resistance of at least one of the SMA wires 8 in the actuator arrangement 7 of the resonant actuator assembly 1. A sense resistor is connected in series with the SMA wire 8, and a resistance measurement circuit 35 is provided to perform a measurement indicative of potential difference across at least one of the SMA wires 8 (as described above). In other embodiments, a position sensor 23 such as a Hall sensor may be provided instead. The system 100 also comprises a processor 41 in connection with the light source 47, the ToF image sensor 43, and the position detection circuit 33.

The processor 41 comprises a controller. During use, light source 47 provides illumination 51 in the form of a stripe and in a discrete flash. The controller then provides a movement command to the resonant actuator assembly 1 to move the movable part 5. This may trigger a drive circuit 31 of the resonant actuator assembly 1 to provide a drive signal to the actuator arrangement 7. The movement of the movable part 5 causes the illumination 51 to be moved across at least part of the subject 101. The movable part 5 is moved by the resonant actuator assembly 1 by the contraction of at least one of the SMA wires 8 in the actuator arrangement 7 upon heating of the SMA wires 8. The light source 47 continues to provide flashes of stripes of illumination 51 as the movable part 5 moves the illumination 51 across the subject 101.

Significantly, in this example, the position detection circuit 33 is synchronised with the light source 47. In particular, the position detection circuit 33 comprises an analogue to digital converter (ADC), and the ADC is synchronised with the light source 47. The position detection circuit 33 provides position data of the movable part 5 (in the form of a measure of the relative position of the movable part 5 with respect to the support structure 3) by measuring the resistance of at least one of the SMA wires 8. Due to the synchronisation, this resistance measurement is synchronised to be performed when the light source 47 emits illumination 51. In particular, the position detection circuit 33 is synchronised to perform the resistance measurement at the start of the flash of illumination 51. However, it will be understood that the resistance measurement could be taken at any time during the flash of illumination 51, or at the end of the flash of illumination 51, as long as consistent synchronisation exists. Light scattered by the subject 101 is received by the ToF image sensor 43, which provides depth data dependent on the received light to the processor 41. The position detection circuit 33 provides position data to the processor 41. As the illumination 51 is scanned across the subject 101, a plurality of data points for both position data and depth data are obtained, all of which are provided to the processor 41. The transmission of this data may typically introduce latency from various sources. However, the effect of this latency is mitigated due to the synchronisation of the position detection circuit 33 with the light source 47, as the processor 41 has knowledge of which position data points correspond to which depth data values. Thus, the position data and depth data is correlated by the processor 41 and an accurate depth map 110 is produced as the output of the processor 41 due to the avoidance of impact of latency.

In some embodiments, the Time of Flight (TOF) system 100 of FIG. 15 may be provided with a resonant actuator assembly 1 where the restoring force being substantially linear, or non-linear, with the displacement of the movable part 5. In such embodiments, the ToF image sensor 43 may only provide data when the movable part 5 has moved into predetermined positions where flatter regions of a histogram of position over time is expected. This means that the movable part 5 may spend a more equal part of its time in each region during sensing.

Figure 16:
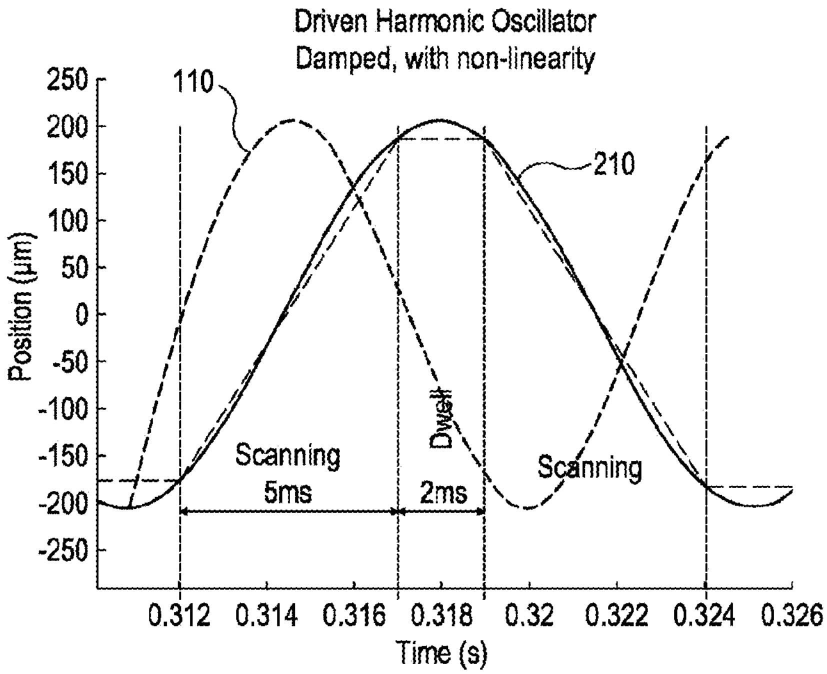
FIG. 16 is a plot of the response in a resonant actuator assembly.
Figure 17:
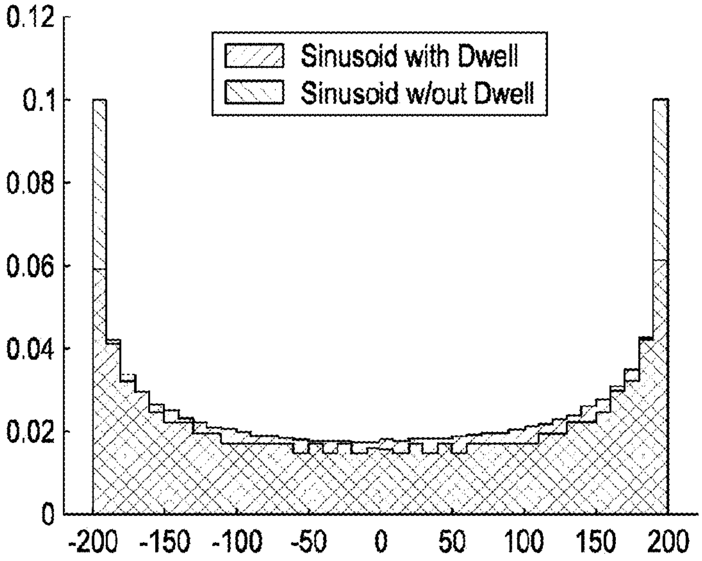
FIG. 17 is a histogram of position against time over the resonance period of a resonant actuator assembly as shown in FIG. 16.

FIGS. 16 and 17 are respectively a plot of the response in the resonant actuator assembly 1 of FIG. 15, and a histogram of position against time over the resonance period of the resonant actuator assembly 1. The resonant actuator assembly 1 is arranged to have a restoring force that is substantially linear with the displacement of the movable part 5. Thus, as shown in FIG. 16, the response of resonant actuator assembly 1 can be characterised as a sinusoidal waveform.

In a first example, as denoted by a dotted line 110, has a resonance period of 10 ms. In this example, the ToF image sensor 43 is configured to continuously sense scattered light from the subject 101 throughout the range of movement, thus causing the moveable part to spend disproportionately more time at the extremes of motion as shown in FIG. 17.

In a second example, as denoted by a solid line 210 in FIG. 16, has a longer resonance period of 14 ms. In this example, a 2 ms dwell period is introduced during which the ToF image sensor 43 is configured to cease sensing scattered light as it moves towards the extremes of motion, e.g. when the movable part has moved to a position within 25 μm from the ends of its movement range. Advantageously, as shown in FIG. 17, the introduction of dwell period causes a shift toward more equal probability of each position being occupied. Furthermore, during the dwell period the ToF image sensor 43 may be given the opportunity to carry out other non-sensing tasks, e.g. outputting data based on previously sensed light.

The introduction of a dwell period may lengthen the resonance period. Therefore, alternatively, the resonance period may remain unchanged with a reduction in sensing time in a resonance cycle. As an example, a dwell period of 1 ms with a shortened sensing time of 4 ms may be applied in a 10 ms resonance period.

The invention claimed is:

1. A resonant actuator assembly comprising:

a support structure;

a movable part that is capable of relative motion with respect to the support structure; and an actuator arrangement arranged to drive relative motion of the movable part at a resonance of the resonant actuator assembly, the resonant actuator assembly being arranged to provide a restoring force to the movable part with a stiffness that increases when a magnitude of displacement of the movable part from an equilibrium position with respect to the support structure increases, so as to flatten a histogram of position against time over the resonance period compared to an equivalent system where the restoring force has a constant stiffness, and the actuator arrangement being arranged to drive the relative motion of the movable part at a resonance of the resonant actuator assembly, the restoring force being non-linear with the displacement.

2. The resonant actuator assembly according to claim 1, wherein the actuator arrangement comprises at least one SMA wire and the actuator assembly further comprises a drive circuit arranged to supply drive signals to the at least one SMA wire, and wherein the drive signals comprises pulses at a resonant frequency of the resonance.

3. The resonant actuator assembly according to claim 2, wherein the at least one SMA wire is inclined at an acute angle with respect to a movement axis of the relative motion of the movable part.

4. The resonant actuator assembly according to claim 2, wherein the resonant actuator assembly further comprises at least one intermediate part that is capable of relative motion with respect to the support structure and the movable part, and the actuator arrangement comprises plural stages of at least one SMA wire each arranged to drive relative motion between two parts of the support structure, the at least one intermediate part and the movable part in mechanical series so as to additively drive the relative motion of the movable part with respect to the support structure.

5. The resonant actuator assembly according to claim 2, wherein the actuator arrangement comprises opposed SMA wires arranged to drive the relative motion of the movable part in opposite directions along a movement axis, wherein the opposed SMA wires are inclined at an acute angle so as to provide components of force perpendicular to the movement axis in the same direction.

6. The resonant actuator assembly according to claim 2, wherein the actuator arrangement comprises at least one SMA wire arranged to drive the relative motion of the movable part in a first direction along a movement axis and no SMA wires arranged to drive the relative motion of the movable part in a second direction opposite to the first direction.

7. The resonant actuator assembly according to claim 2, wherein the resonant frequency is at least 10 Hz, and/or wherein the range of displacement is at least 10 μm.

8. The resonant actuator assembly according to claim 1, wherein the actuator arrangement comprises opposed pairs of SMA wires, the SMA wires of each pair being inclined at equal and opposite acute angles with respect to the movement axis of the relative motion of the movable part so as to provide balanced components of force perpendicular to the movement axis.

9. The resonant actuator assembly according to claim 1, wherein the resonant actuator assembly further comprises a resilient element connected between the movable part and the support structure, and arranged to provide at least part of said restoring force.

10. The resonant actuator assembly according to claim 1, further comprising a bearing arrangement arranged to guide relative motion of the movable part with respect to the support structure, wherein the bearing arrangement is arranged to provide no restoring force, or wherein the bearing arrangement is arranged to provide a restoring force that is at least an order of magnitude less than the restoring force provided by the actuator arrangement, or wherein the bearing arrangement is arranged to provide a restoring force that is at least an order of magnitude more than the restoring force provided by the actuator arrangement.

11. The resonant actuator assembly according to claim 1, further comprising a position detection circuit arranged to derive a measure of the relative position of the movable part with respect to the support structure, wherein the resonant actuator assembly further comprises a position sensor arranged to sense the relative position of the movable part from the position sensor, and the position detection circuit is arranged to derive the measure of the relative position of the movable part from the output of the position sensor, or wherein the actuator arrangement comprises at least one SMA wire, the resonant actuator assembly further comprises a resistance measurement circuit arranged to measure the resistance of the at least one SMA wire, and the position detection circuit is arranged to derive the measure of the relative position of the movable part from the output of the measured resistance.

12. The resonant actuator assembly according to claim 1, wherein the movable part is an optical component, and wherein the resonant actuator assembly is arranged to scan a beam of light.

13. The resonant actuator assembly according to claim 1, wherein the resonant actuator assembly is arranged to provide the restoring force with an increase in stiffness when a magnitude of the displacement from the equilibrium position increases above a predetermined threshold.

14. The resonant actuator assembly according to claim 13, wherein the resonant actuator assembly comprises a resilient bumper between the movable part and the support structure, the resilient bumper being arranged to be disengaged when the magnitude of the displacement from the equilibrium position is below the predetermined threshold and to be engaged to provide the restoring force with the increase in stiffness when the magnitude of the displacement from the equilibrium position increases from the predetermined threshold.

15. A resonant actuator assembly comprising:

a support structure;

a movable part that is capable of relative motion with respect to the support structure; and an actuator arrangement comprising at least one SMA wire arranged to drive the relative motion of the movable part, wherein the at least one SMA wire is inclined at an acute angle with respect to a movement axis of the relative motion of the movable part, the resonant actuator assembly being arranged to provide a restoring force to the movable part on displacement from an equilibrium position with respect to the support structure, and the actuator arrangement being arranged to drive the relative motion of the movable part at a resonance of the resonant actuator assembly.

16. A system comprising:

a sensor for sensing light, the sensor being configured to provide data dependent on the sensed light; and a resonant actuator assembly comprising:

a support structure;

a movable part that is capable of relative motion with respect to the support structure; and an actuator arrangement arranged to drive the relative motion of the movable part over a movement range, the resonant actuator assembly being arranged to provide a restoring force to the movable part on displacement from an equilibrium position with respect to the support structure, and the actuator arrangement being arranged to drive the relative motion of the movable part at a resonance of the resonant actuator assembly, the restoring force being substantially linear or non-linear with the displacement; and wherein the sensor is configured to cease providing data when the movable part has moved within less than 10% of the movement range towards each end of the said movement range.

17. The system according to claim 16, wherein the sensor is configured to cease providing data when the movable part has moved within less than 8%, or less than 5%, of the movement range towards each end of the said movement range.

18. The system according to claim 16, wherein the system is a Time of Flight (TOF) system, comprising an illumination source for illuminating a subject, wherein the sensor is configured to sense light scattered by the subject, and wherein the movable part having an optical component for focusing or reflecting illumination onto the subject.

* * * * *